United States Patent
Provencher et al.

(10) Patent No.: US 10,447,804 B2
(45) Date of Patent: Oct. 15, 2019

(54) FILE TYPE ASSOCIATION IN A REMOTE COMPUTING SESSION

(75) Inventors: Michael A. Provencher, Cypress, TX (US); Kent E. Biggs, Tomball, TX (US); Thomas J. Flynn, Magnolia, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1548 days.

(21) Appl. No.: 13/123,716

(22) PCT Filed: Oct. 28, 2008

(86) PCT No.: PCT/US2008/081405
§ 371 (c)(1),
(2), (4) Date: Apr. 11, 2011

(87) PCT Pub. No.: WO2010/050927
PCT Pub. Date: May 6, 2010

(65) Prior Publication Data
US 2011/0202583 A1 Aug. 18, 2011

(51) Int. Cl.
*G06F 12/00* (2006.01)
*G06F 17/30* (2006.01)
*H04L 29/08* (2006.01)
*H04L 29/06* (2006.01)

(52) U.S. Cl.
CPC .............. *H04L 67/30* (2013.01); *H04L 69/24* (2013.01)

(58) Field of Classification Search
CPC .................................. H04L 67/30; H04L 69/24
USPC ........................................................ 707/827
See application file for complete search history.

(56) References Cited

U.S. PATENT DOCUMENTS

| | | | | |
|---|---|---|---|---|
| 5,922,054 A | * | 7/1999 | Bibayan | G06F 9/4443 707/999.202 |
| 6,269,371 B1 | * | 7/2001 | Ohnishi | G06F 9/4406 |
| 6,339,826 B2 | | 1/2002 | Hayes, Jr. et al. | |
| 6,594,699 B1 | | 7/2003 | Sahai et al. | |
| 6,918,113 B2 | * | 7/2005 | Patel | G06F 8/65 709/219 |
| 6,934,749 B1 | * | 8/2005 | Black | G06F 1/14 709/217 |
| 6,952,714 B2 | | 10/2005 | Peart | |

(Continued)

FOREIGN PATENT DOCUMENTS

| | | | | |
|---|---|---|---|---|
| CN | 1599901 A | | 3/2005 | |
| GB | 2414577 A | * | 11/2005 | G06F 8/61 |

OTHER PUBLICATIONS

WIPO. International Search Report, dated Jun. 23, 2009, PCT/US2008/081405, filed Oct. 28, 2008.

*Primary Examiner* — Pavan Mamillapalli
(74) *Attorney, Agent, or Firm* — Brooks, Cameron & Huebsch PLLC

(57) ABSTRACT

A system and method for enhancing operability of client-server computing system is herein disclosed. A system includes a first computing device. The first computing device includes a file type association module. The file type association module determines, as part of a remote computing session, whether to associate a file type with an application program on the first computing device or an application program on a second computing device. The file type association module causes the file type to associate with the application program on one of the first and second computing devices.

14 Claims, 2 Drawing Sheets

(56) References Cited

U.S. PATENT DOCUMENTS

| | | | | |
|---|---|---|---|---|
| 6,983,326 | B1* | 1/2006 | Vigue | H04L 63/12 |
| | | | | 707/999.104 |
| 7,409,405 | B1* | 8/2008 | Masinter | G06F 9/445 |
| 7,779,034 | B2* | 8/2010 | Pedersen | G06F 16/10 |
| | | | | 707/781 |
| 8,010,679 | B2* | 8/2011 | Low | G06F 3/1415 |
| | | | | 709/227 |
| 8,990,697 | B2* | 3/2015 | Patel | G06F 3/048 |
| | | | | 715/738 |
| 9,213,587 | B2* | 12/2015 | Powlette | G06F 9/468 |
| 2003/0084096 | A1* | 5/2003 | Starbuck | G06F 17/3089 |
| | | | | 709/203 |
| 2006/0070029 | A1 | 3/2006 | Laborczfalvi et al. | |
| 2006/0104515 | A1* | 5/2006 | King | G06F 16/93 |
| | | | | 382/190 |
| 2007/0083501 | A1* | 4/2007 | Pedersen et al. | 707/4 |
| 2007/0180448 | A1 | 8/2007 | Low et al. | |
| 2010/0070901 | A1* | 3/2010 | Skinner | G06F 3/0481 |
| | | | | 715/771 |
| 2013/0166507 | A1* | 6/2013 | Staczek | G06F 9/542 |
| | | | | 707/625 |

\* cited by examiner

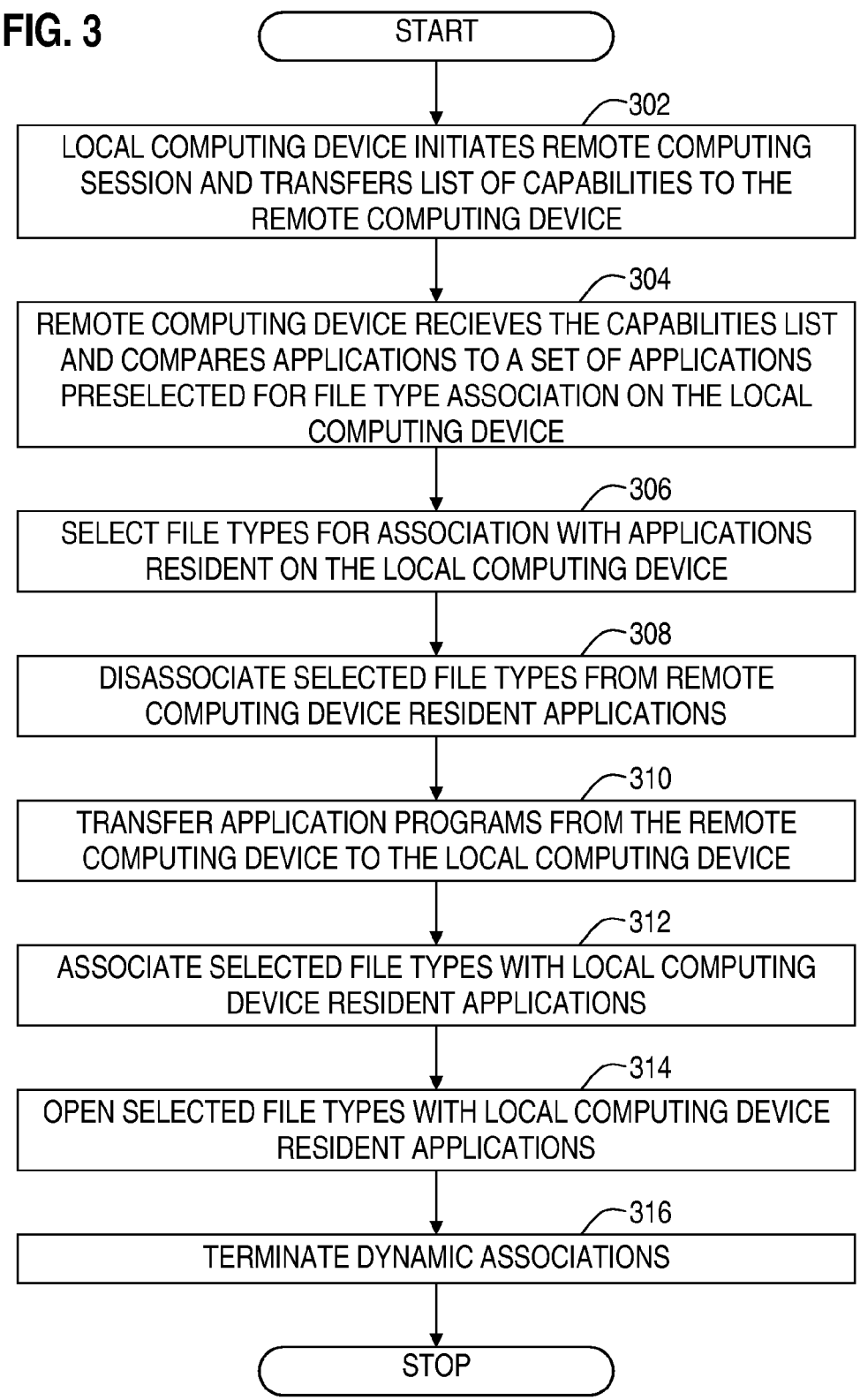

FILE TYPE ASSOCIATION IN A REMOTE COMPUTING SESSION

BACKGROUND

Prior to the advent of the personal computer, a central computer, for example, a mainframe or mint-computer, supporting multiple individual user terminals was the dominant computing paradigm. This centralized architecture allowed for efficient use of expensive computer hardware and software resources by sharing those resources across multiple users.

With the arrival of the relatively inexpensive personal computer, a new computing model arose that employed computing resources localized at each user to displace the remote and centralized resources typifying the earlier era.

The advantages of the centralized computing model are many however, and ubiquitous networking has led to the resurgence of centralized computing in a variety of forms. In one embodiment, a server provides processing and/or storage resources to one or more remote clients. In other embodiments, a remote client is assigned exclusive access to a workstation or personal computer module maintained at a central site. In centralized systems, consolidation of data and program storage and/or computing resources reduces maintenance and support costs, while enabling increased system security. The remote client that accesses a centralized system may take various forms. A remote client having minimal processing and storage capabilities, and that relies on centralized resources for adequate functionality is known as a "thin client." Similarly, a remote client possessing more extensive processing and storage capabilities is termed a "fat client" or a "thick client."

Centralized computer systems are not without disadvantages. For example, failure of a single server supporting multiple users can result in a loss of productivity proportional to the number of users supported. Furthermore, some applications, for example, rendering video on a server and transmitting the renderings to a client for display, can consume an excessive amount of server computing resources and/or network bandwidth. Information, such as video, transmitted from server to client is often highly compressed to reduce the bandwidth required to perform the transfer. Such highly compressed video or other content often results in a less than desirable user experience. Moreover, producing compute intensive content for more than one client can be extremely burdensome for the server, and transmission of the multiple content streams results in an onerous consumption of network bandwidth. Accordingly, improved methods of distributing resources in remote computing systems are desirable.

BRIEF DESCRIPTION OF THE DRAWINGS

For a detailed description of exemplary embodiments of the invention, reference will now be made to the accompanying drawings in which:

FIG. 3 shows a flow diagram for a method for dynamically associating a file type with an application program resident on either a local computing device or a remote computing device in accordance with various embodiments.

NOTATION AND NOMENCLATURE

Figure 1:
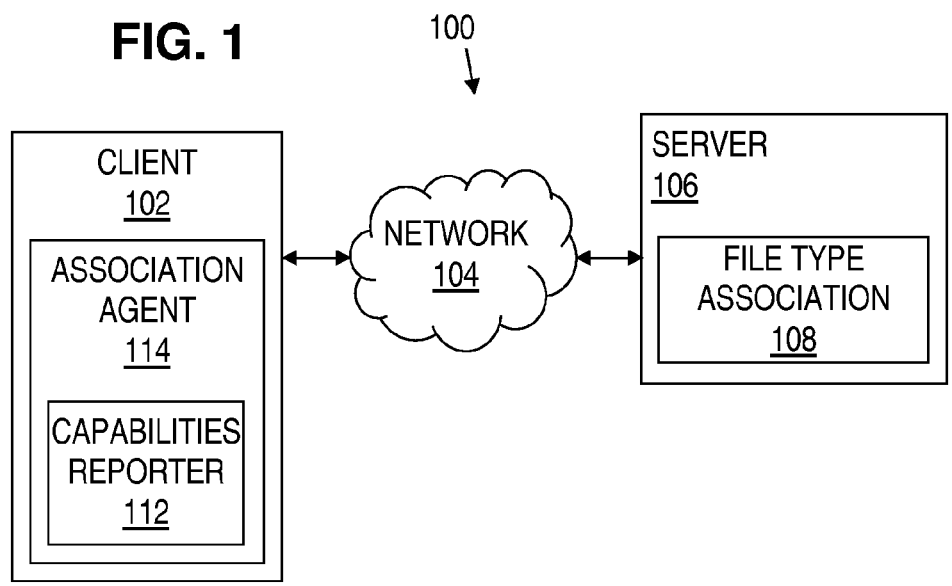
FIG. 1 shows a system that dynamically associates a file type with an application program residing on either a client or a server in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Corporations and other entities deploy centralized computer systems for a variety of reasons. A centralized system provides enhanced security because the entity's data is controlled at a single location. Moreover, maintenance and support costs may be lower with a centralized system than with de-centralized models because those functions can be confined to a central data center.

Users also benefit from the centralized model. Generally, a user may be able to access important data and/or applications from any computer connected to an appropriate network, for example, the internet. A computer and associated software programming requesting access to a resource of a centralized system may generally be referred to as a "client" and from the perspective of the user, as a "local computing device." The local computing device may only need enough local resources (e.g., computing power, storage capacity, etc.) to interface with the central resource and provide user input and output. Thus, the local computing device may be simpler, more reliable, and less costly than a computer providing capabilities equivalent to those offered by the central computer through the local computing device. However, a local computing device will frequently include capabilities (e.g., software and/or hardware assets) in excess of the bare minimum required to interface with the central resource.

A centralized computer and associated software programming from which a client device requests services may generally be referred to as a "server," or from the user's perspective, as a "remote computing device." A server typically allows a user to access various data, software programs, and/or hardware features under the control of the server from a client device that may be remote from the server. Thus, a computing paradigm wherein a local computing device seeks services provided by a remote computing device is often referred to as "remote computing."

Various issues arise in the use of a centralized system, such as a client-server system. Launching some applications in a remote computing session can consume significant host (i.e., server) resources. Any resources utilized in the session are lost to other users. Moreover, producing content on the server and transmitting the content to the client for display often results in a poor viewing experience for the user because the content must be tailored to the processing capabilities of the client and server, and to the available network bandwidth. Client-server systems require flexible and efficient means to conserve resources while enhancing the overall user experience. Embodiments of the present disclosure allow a remote computing device to optimize available resources and improve the overall experience of a local user by dynamically allocating processing to either a local or a remote computing device. In some embodiments, such allocation is achieved by dynamically associating a file type with an application program resident on one of either the local computing device or the remote computing device.

FIG. 1 shows a system 100 that dynamically associates a file type with an application program on either a client 102 or a server 106 in accordance with various embodiments. In the system 100, the client 102 and the server 106 preferably communicate via the network 104. For simplicity, a single client 102 is illustrated, but in practice, any number of clients may be coupled to the server 106 via network 104. The network 104 may comprise any available computer networking arrangement, for example, a local area network ("LAN"), a storage array network ("SAN"), a wide area network ("WAN"), a metropolitan area network ("MAN"), the internet, etc. Further, the network 104 may comprise any of a variety of networking technologies, for example, wired, wireless, or optical techniques may be employed. Accordingly, the components of system 100 are not restricted to any particular location or proximity to one another, but rather may be located at any distance from one another as required to meet the needs of the operating entity and/or the user.

The client 102 preferably transmits, via network 104, requests for access to data, programs, hardware, etc. controlled by the server 106. The time interval over which the client 102 and the server 106 maintain a connection is termed a "session." A session is initiated by a request from the client 102 to the server 106. The client 102 and server 106 are connected using a remote access protocol, for example, Microsoft® Remote Desktop Protocol ("RDP") or Remote Graphics Software by Hewlett Packard®. Components of the remote access protocol execute on both the client 102 and the server 106. Embodiments of the present disclosure are not limited to any particular remote access protocol.

The server 106 may be implemented as a software program executed on any of a variety of computing devices, for example, a personal computer, a workstation, a server computer, a mainframe or any other computing platform adapted to execute the programming of server 106. A server computer generally includes a processor coupled by one or more buses to various storage devices (e.g., disk drives, optical storage devices, volatile and/or non-volatile semiconductor memories, etc.), network interfaces, printers, human interface devices, etc. The server 106 software generally includes an operating system and a variety of application programs, drivers, etc.

Similarly, the client 102 may be implemented as software programming executed on a variety of computing devices, for example, a personal computer (e.g., a desktop, laptop, tablet computer, etc.), a thin client computer appliance, or any other computing device configured to perform as a client device. The client 102 may include only the software programming required to initiate and sustain a remote session with the server 106, or may include additional software enabling a higher level of functionality employable separate from or in concert with the server 106.

As shown in the example of FIG. 1, client 102 includes an association agent 114 and capabilities reporter 112. The capabilities reporter 112 is a software program that catalogues and reports various client 102 capabilities to the server 106. In some embodiments, the capabilities reporter 112 notifies the server 106 of client 102 capabilities during client 102 initiation of a remote computing session with the server 106. The client 102 capabilities reported to the server 102 by the capabilities reporter 112 can include various client 102 operational assets. For example, embodiments of the capabilities reporter 112 may include in the capabilities report lists of application programs, services, coder-decoders ("codecs"), and drivers resident in the client 102. Additionally, client hardware capabilities (e.g., hardware components contained in or coupled to the client) may be included in the report. The client capabilities report is transferred to the server 106 via the network 104.

Figure 2:
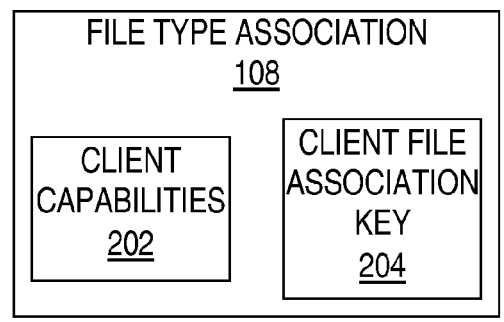
FIG. 2 shows a server file type association module that selects file types for association with client resident applications in accordance with various embodiments.

The server 106 includes a file type association module 108. The file type association module 108 determines whether a particular file type should be opened by the server 106 or the client 102. As shown in FIG. 2, the file type association module receives the capabilities report 202 sent by the client 102. Based on the assets of the client 102 listed in the capabilities report 202, the file type association module 108 determines whether client 102 resources or server 106 resources are best applied to service a client 102 request. For example, if the client 102 requests playback of a video file, an embodiment of the server 106 may play the video file on a player resident on the server 106 to render the video, and transmit the rendered video to the client 102 via network 104 for display by the client 102. Some server 106 embodiments select a player to render the video by file association. A file association establishes a relationship between a file type and an application used to open that file type. File type is generally established by the extension field of the file name. For example, a file having an ".mpg" extension is an MPEG video file (encoded in accordance with a Motion Pictures Expert Group standard) and is playable on a variety of multi-media players (e.g., Microsoft® Windows® Media Player).

Embodiments of the system 100 executing the client 102 file access requests only on the server 106 are subject to the above-explained shortcomings, specifically, undue server and/or network burden and increased likelihood of a poor user experience. Embodiments of the present disclosure employ the association agent 114, capabilities reporter 112, and the file type association module 108 to alleviate these deficiencies. The file type association module 108 evaluates the capabilities of the client 102 as submitted in the client capabilities report 202. If the client 102 includes resources for opening a particular file type, the file type association module 108 can disassociate the particular file type from an application program residing on the server 106 and cause the client 102 to associate the file type with an application program resident on the client 102, thus, re-associating the file type to the client application. The file type association module 108 can cause the file type to associate with an application in the client 102 by transmitting an association message to the association agent 114. On receipt of a message indicating that a particular file type and application should be associated, the association agent 114 acts to realize the association.

After the association is established, if the client 102 attempts to open a file of the re-associated type, the file will open locally using the selected client application and processing assets. Any file opened by the client 102 may reside on either the client 102 or the server 106. Each file opened can be transferred to the association site (i.e., either the client 102 or the server 106) for access. Thus, embodiments of the present disclosure dynamically associate file types with application programs on the server 106 or the client 102 to reduce server and/or network loading and improve the overall user experience. Generally, a file type dynamically associated with a client 102 application will remain associated with the client 102 only for the duration of the remote computing session during which the re-association was performed. However, in some embodiments the re-association may persist across more than one session, or persist until cancelled by the file type association module 108.

Embodiments of the file type association module 108 apply various criteria for determining whether to re-associate a file type to a client 102 application. One embodiment re-associates a file type to the client 102 if the client 102 includes software programming (e.g., application programs, codecs, drivers, etc.) for opening the file type. Other embodiments may consider the client's hardware capabilities in addition to the client's software capabilities. For example, if the client 102 includes hardware acceleration for video decoding, an embodiment may weigh such inclusion as a factor favoring re-association of video file types to the client 102.

As shown in FIG. 2, at least some embodiments of the file type association module 108 includes a client file association key 204 that directs the file type association module 108 as to what particular file types may be dynamically associated to the client 102. Moreover, in some embodiments the client file association key 204 can include criteria for re-associating a file type to the client 102. In some embodiments, the file type association module 108 compares the client capabilities report 202 to the client file association key 204 to determine whether a file type should be dynamically associated with a client 102 application. Generally, a system administrator will determine the dynamically associable file types and the criteria for re-association included in the client file association key 204.

In some embodiments, if the file type association module 108 determines that the client 102 does not include software programming necessary to open a particular file type, but other client 102 resources favor re-association (e.g., the client 102 hardware is capable of performing processing required by the file type), the file type association module 108 can download the necessary software to the client 102. Thereafter, the file type can be dynamically associated with the client 102 software.

FIG. 3 shows a flow diagram for a method for dynamically associating a file type with an application program on either a local computing device 102 or a remote computing device 106 in accordance with various embodiments. Though depicted sequentially as a matter of convenience, at least some of the actions shown can be performed in a different order and/or performed in parallel. Additionally, some embodiments may perform only some of the actions shown. In block 302, a local computing device 102 (i.e., a client computing device) initiates a remote computing session and transfers a list of capabilities 202 to the remote computing device 106 (i.e., a server computing device). The capabilities reported to the remote computing device 106 include, for example, resident software programming (e.g., application programs, codecs, drivers, software revisions, etc.) and hardware capabilities.

In block 304, the remote computing device 106 receives the capabilities list 202. In at least some embodiments, the remote computing device 106 evaluates the reported capabilities with reference to client file association key 204 comprising a pre-selected set of applications programs that when present on the local computing device 102 may allow for dynamic association of a file type with the application program on the local computing device 102. In some embodiments, other attributes and capabilities of the local computing device (e.g., hardware capabilities) are considered as well. Based, at least in part, on the evaluation of the software available on, and/or the hardware capabilities of the local computing device 102, the remote computing device 106 selects file types for dynamic association with local computing device 102 resident applications in block 306.

File types selected for re-association with locally resident application programs are disassociated from applications handling those file types on the remote computing device 106 in block 308. Such disassociations are effective only as to operations requested by the local computing device 102. In some embodiments, the disassociations are effective for no more than the duration of the current computing session between the local computing device 102 and the remote computing device 106. In other embodiments, the disassociation, with regard to the local computing device 102 may persist until cancelled by the remote computing device 106.

In some embodiments, a file type may be selected for re-association with an application resident on the remote access device 102, even if the application is not reported as resident on the device 102. Such selection may occur if other factors (e.g., local computing device 102 hardware assets) favor re-association, and the remote computing device 106 can provide the required software to the local computing device 102. Thus, in block 310, application programs necessary to process a file type selected for re-association with the local computing device 102 are transferred from the remote computing device 106 to the local computing device 102.

In block 312, the selected file types are associated with application programs on the local computing device 102. The associations can be created via messages transferred from the remote computing device 106 to the association agent 114 of the local computing device 102. The re-associations will cause access of the selected file types, in block 314, to be performed by local computing device 102 resident applications. Thus, the computing burden on the remote computing device 106 is lessened, network loading is reduced in at least some cases, and the overall user experience is improved in cases where local resources process the selected file types more effectively than remote resources.

The dynamic associations established above are generally terminated, in block 316, at the conclusion of the remote computing session, in which case, the file associations revert to applications resident on the remote computing device 106. However, embodiments of the present disclosure may terminate dynamic associations at any time selected by the remote computing device 106.

The above discussion is meant to be illustrative of the principles and various embodiments of the present invention. Numerous variations and modifications will become apparent to those skilled in the art once the above disclosure is fully appreciated. For example, while embodiments have been described in relation to client-server computer systems, those skilled in the art will recognize that embodiments are applicable to other systems employing networked computing devices. For example, embodiments of the invention may be applicable to optimizing devices connected via a cellular telephone network. It is intended that the following claims be interpreted to embrace all such variations and modifications.

What is claimed is:

1. A system to dynamically associate a file type, comprising:
    a remote computing device comprising a file type association module that determines, as part of a remote computing session between the remote computing device and a local computing device, to dynamically associate a file type with an application program on the local computing device, and causes:
        the file type to dynamically associate with the application program on the local computing device; and
        the file type to disassociate from an application program on the remote computing device based, at least in part, on the inclusion of an application program for opening the file type in the local computing device.

2. The system of claim 1, wherein the file type association module causes the local computing device to dynamically associate the file type with the application program resident on the local computing device as part of the remote computing session.

3. The system of claim 1, wherein the second computing device comprises a capabilities reporter that provides, to the remote computing device, as part of the remote computing session, a report listing capabilities of the local computing device.

4. The system of claim 3, wherein the capabilities report comprises at least one list of assets of the local computing device selected from a group consisting of a list of application programs, a list of drivers, a list of coder-decoders, and a list of hardware assets.

5. The system of claim 1, wherein the file type association module comprises at least one of a list of application programs for which an associated file type will be re-associated with the application program resident on the local computing device, and a list of file types that will be re-associated with the application program resident on the local computing device.

6. The system of claim 2, wherein the file type association with an application program resident on the local computing device is persistent for the remote computing session.

7. The system of claim 1, wherein the dissociation is effective only for a duration of the remote computing session.

8. The system of claim 7, wherein following the remote computing session the file type re-associates with an application program on the remote computing device.

9. The system of claim 1, wherein the dissociation is effective until being cancelled by the remote computing device.

10. The system of claim 9, wherein the file type re-associates with an application program on the remote computing device in response to being cancelled by the remote computing device.

11. The system of claim 1, wherein the remote computing device comprises a server.

12. A computer program product, comprising:
    a non-transitory computer readable medium having computer readable program code embodied therein, the computer readable program code comprising:
    instructions that evaluate which of a remote computing device and a local computing device should open a file type; and
        instructions that, based on a result of the evaluation, disassociate the file type from an application program resident on the remote computing device based at least in part, on the inclusion of an application program for opening the file type in a local computing device; and
        cause the local computing device to associate the file type with an application program resident on the local computing device.

13. The computer program product of claim 12, further comprising instructions that receive a first list of application programs transmitted by the local computing device, the application programs in the first list are resident on a local computing device.

14. The computer program product of claim 13, further comprising instructions that compare the application programs of the first list with application programs of a second list and base the disassociation, at least in part, on the results of the comparison.

* * * * *